(12) United States Patent
Ruetenik

(10) Patent No.: US 8,656,691 B2
(45) Date of Patent: Feb. 25, 2014

(54) REDUCED WEIGHT EQUINE ORTHOTIC PAD AND METHOD

(76) Inventor: Monty L. Ruetenik, Clear Lake Shores, TX (US)

( * ) Notice: Subject to any disclaimer, the term of this patent is extended or adjusted under 35 U.S.C. 154(b) by 47 days.

(21) Appl. No.: 13/396,191

(22) Filed: Feb. 14, 2012

(65) Prior Publication Data

US 2012/0279184 A1    Nov. 8, 2012

Related U.S. Application Data

(60) Provisional application No. 61/481,490, filed on May 2, 2011.

(51) Int. Cl.
*A01L 5/00* (2006.01)
*B68C 5/00* (2006.01)

(52) U.S. Cl.
USPC .................................. 54/84; 168/14; 168/28

(58) Field of Classification Search
USPC ...................................... 168/26, 28, 14; 54/82
IPC ..................... A01L 5/00, 3/00, 1/00; B68C 5/00
See application file for complete search history.

(56) References Cited

U.S. PATENT DOCUMENTS

| | | | | |
|---|---|---|---|---|
| 3,747,683 A | * | 7/1973 | Smith | 168/25 |
| 4,513,825 A | * | 4/1985 | Murphy | 168/12 |
| 5,073,444 A | * | 12/1991 | Shanelec | 428/313.5 |
| 6,896,065 B2 | * | 5/2005 | Kriesel et al. | 168/12 |
| 2004/0112611 A1 | * | 6/2004 | Kriesel et al. | 168/12 |
| 2006/0118311 A1 | * | 6/2006 | Serritella et al. | 168/4 |
| 2007/0107389 A1 | * | 5/2007 | Ruetenik | 54/82 |
| 2012/0018175 A1 | * | 1/2012 | Revheim et al. | 168/12 |

* cited by examiner

*Primary Examiner* — Shadi Baniani
(74) *Attorney, Agent, or Firm* — Douglas Baldwin

(57) ABSTRACT

There is disclosed an improved shock absorbing, lightweight, thermally insulative orthotic pad designed for use in a pad and boot assembly for hoofed livestock. The pad is comprised of a mixture of flexible spheroids and elastomeric materials. In a preferred embodiment, elastomeric material generally is more concentrated at the top portion of the pad, and spheroids dispersed in a matrix of elastomeric material concentrated at the bottom section of the pad. The spheroids have a lower density than the elastomeric materials and possess better thermally insulative properties, and in a particularly preferred embodiment, at least some of the spheroids are comprised of closed-cell polypropylene foam. A method of making the light weight pad is also disclosed.

5 Claims, 3 Drawing Sheets

REDUCED WEIGHT EQUINE ORTHOTIC PAD AND METHOD

RELATIONSHIP TO OTHER APPLICATIONS

This application claims benefit of Provisional application Ser. No. 61/481,490 filed May, 2, 2011.

FIELD OF THE INVENTION

This invention relates to a reduced weight orthotic pad for hoofed animals, and methods for making such pads. More specifically, it relates to an orthotic pad made of spheroids dispersed in elastomeric gel, such that the orthotic pad's thermal insulation properties are increased, and its weight is reduced, while maintaining or increasing durability and cushioning.

BACKGROUND

A variety of devices have been developed over the years for both protection and therapy of hoofed animals, particularly equines. One such device in particular, described in U.S. Pat. No. 7,445,051 issued Nov. 4, 2008 and patent publications 20070107389, published May 17, 2007 and 20090032270, published Feb. 5, 2009. These describe a flexible equine boot, and a shock absorbing orthotic pad that is designed to be disposed inside and at the bottom of the boot creating a boot assembly. This assembly assists in shock-absorption during transport and stalling, and plays an essential therapeutic role in laminitis and other diseases of the hoof and leg. A desirable composition of and process for manufacturing said pads is described in U.S. Pat. No. 7,445,051, Nov. 4, 2008.

The significant weight of the current commercial embodiments of the boot and elastomeric pad assemblies described above is a source of concern to some equine owners and veterinarians, particularly regarding the hypothetical negative impact the weight of the pad and boot assembly may have upon the animal's stride.

In addition to the weight of current elastomer gel pad there is a need for boots and pads that will provide additional thermal insulation. Aluminum trailers are increasingly popular as a means of transporting equines, due at least in part to their lower fuel costs and durability. One of the disadvantages of aluminum trailers, however, is high thermal conductivity, particularly of the floor. Because exhibition and performance horses are often transported in the summer months the heat radiating from the road surface through the trailer floor can be detrimental to the horses' health and performance. Overheating of transported animals results in fatigue, and fatigue decreases performance, a particular problem for performance and exhibition animals. Currently, the standard practice in summer months, particularly in hot regions, is to transport animals during the night when both ambient temperature and road surface temperature are lower.

Many manufacturers of high quality, modern trailers seek to address the high thermal conductivity of aluminum trailers by offering windows, open door ways, and insulation packages for the trailer roof and sides; however, few, if any, offer insulated floors.

Although air conditioning is one option to prevent overheating during transportation it does little to reduce the heat conducted through the floor to the horse's feet and legs, making it more effective to directly insulate and cool the feet and legs.

The hard, heavy rubber mats used for slip prevention on the floors of aluminum trailers have increased the demand for comfortable footing, such as the boot and elastomeric gel pad assemblies previously mentioned. Therefore, increasing the thermal insulation properties of the gel pad would provide an economical and effective method of preventing overheating without resorting to air conditioning and/or thick, heavier cushioning mats in the entire trailer. This invention does just that.

SUMMARY OF THE INVENTION

In broad aspect, this invention is an improved shock absorbing, light-weight, thermally insulative orthotic pad designed for use in a pad and boot assembly for hoofed livestock. The pad is comprised of a mixture of flexible spheroids and elastomeric materials. In a preferred embodiment, elastomeric material generally comprises the top portion of the pad, and spheroids dispersed in a matrix of elastomeric material comprise the bottom portion. The spheroids have a lower density than at least one of the elastomeric materials and possess better thermally insulative properties, and in a particularly preferred embodiment, at least some of the spheroids are comprised of closed-cell polypropylene foam. In other embodiments, the pad is elliptically shaped when viewed from the top or bottom, may be wedge shaped when viewed from the side, and may include a triangular projection designed to contact a horse's frog and/or a front projection designed to cushion an animal's toe. The pad may be comprised of multiple generally distinct regions formed of differing elastomeric materials, with at least one region containing spheroids. Additionally, the pad may be comprised of multiple types of spheroids, which may be mixed together or separated into generally distinct regions.

The improved shock absorbing orthotic pad of this invention provides both reduction in weight and improvements in thermal insulation over current pads, while maintaining essential properties of the boot/pad assembly described in U.S. Pat. No. 7,445,051 including durability of the pad, the ability to attach a double-sided touch fastener strip to the bottom of the pad to provide rotational stability in the boot, and sufficient depth and elastomeric properties to cushion, massage and support the hoof as desired.

In general, the spheroids are dispersed in at least one unset liquid elastomeric material during curing. The elastomer acts as a binder forming a supportive matrix for the spheroids. The resulting mixture is comprised of elastomer monomers, curing agent, catalyst and spheroids. This mixture is cast in an open mold in which the open top of the mold corresponds to the bottom of the finished pad. The final dispersion (dependent upon the speed of dispersion and the tendency of the lighter spheroids to rise to the top) of the spheroids in the cured pad is controlled by controlling at least one of 1) the amount of catalyst used in formulating the elastomeric material that control the speed of curing, 2) the duration of mixing of the elastomeric material and/or the mixture of spheroids and elastomeric material, and 3) the temperature of the components of the elastomeric material before mixing. In another preferred embodiment, a hook-and-loop type fastener system is embedded in the elastomeric material prior to curing.

DETAILED DESCRIPTION OF THE INVENTION

This invention is a flexible, cushioning, shock-absorbing pad with low thermal conductivity and low weight per volume, and, in one embodiment, a process for making such pads by dispersing spheroids in one or more elastomeric materials. In broad aspect, the pads of the invention are comprised of a mixture of spheroids and flexible, elastic materials designed to be placed in a boot beneath an animal hoof. The spheroids may be incorporated into all or any selected portion of the pad.

In one preferred embodiment, the major amount of spheroids is dispersed in the lower or bottom portion of the pad. The top portion provides a durable, elastic surface for the equine hoof, while the spheroids in the bottom portion increase thermal insulation and decrease total weight of the pad. The spheroids are comprised of a flexible material, preferably expanded foam or other cellular material, and are of a size conducive to dispersion in the elastomer(s) of the pad to create a strong matrix.

A suitable elastomeric pads and boot including suitable materials, are described in U.S. Pat. No. 7,445,051 issued Nov. 4, 2008 and previous patent publications 20070107389, published May 17, 2007 and 20090032270, published Feb. 5, 2009. These relate in part to a completely elastomeric pad as part of an equine pad and boot assembly, and the relevant disclosures describing an elastomeric pad are incorporated herein by reference.

Figure 1:
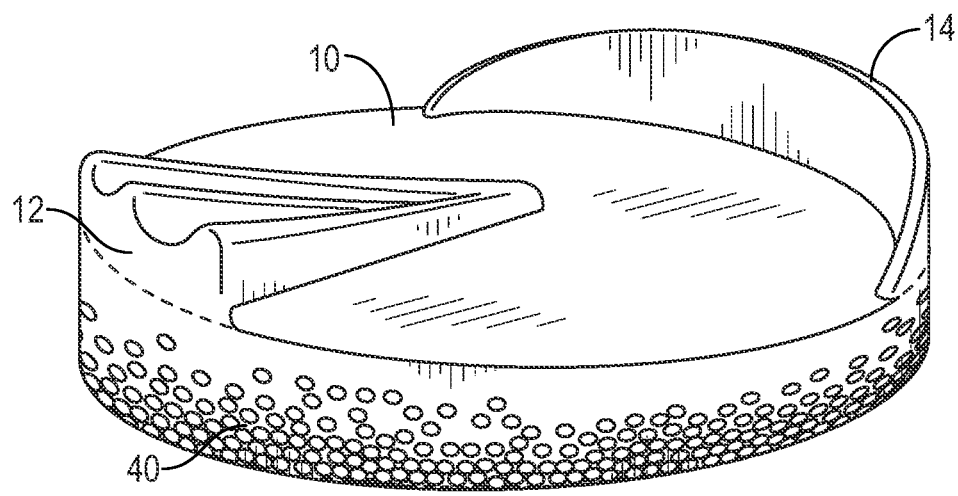
FIG. 1 is an isometric of a pad showing expanded polypropylene spheroids embedded which is an embodiment of the invention.
Figure 2:
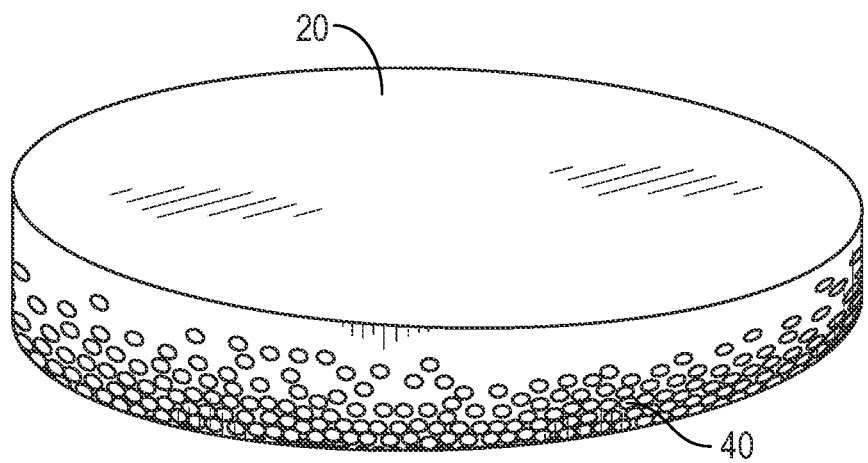
FIG. 2 is an isometric of a pad showing expanded polypropylene spheroids embedded which is another embodiment of the invention.
Figure 3:
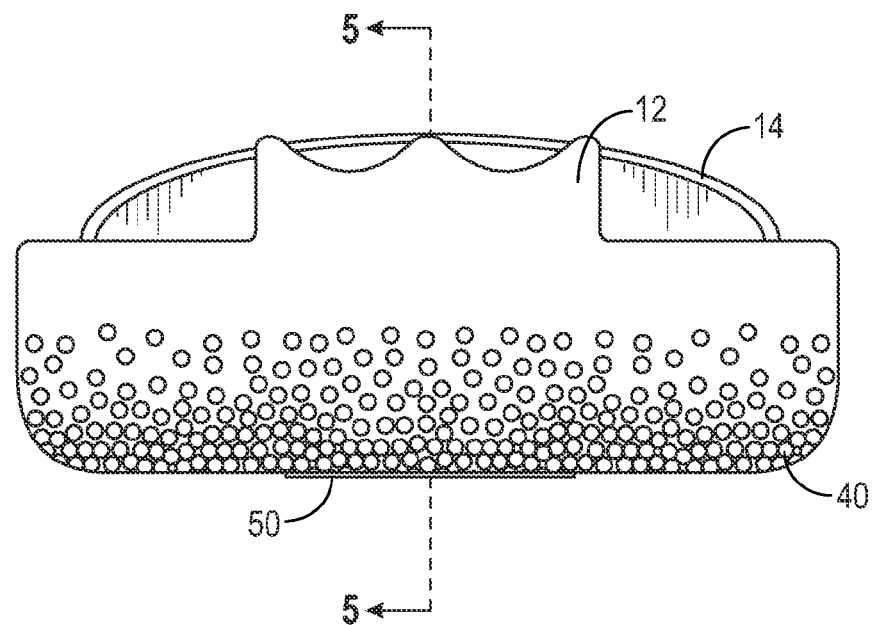
FIG. 3 is an end view of a pad showing expanded polypropylene spheroids embedded which is an embodiment of the invention.
Figure 4:
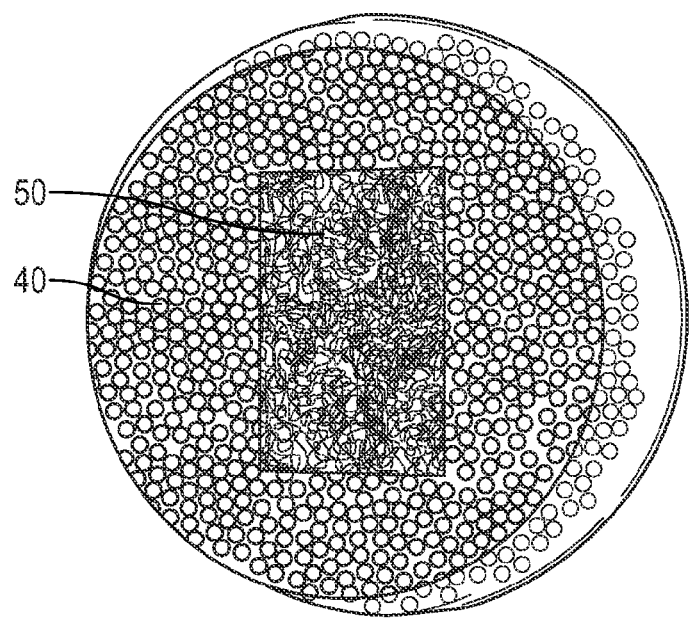
FIG. 4 is a bottom view of an elastomeric shock absorbing pad with expanded polypropylene spheroids embedded, showing a double sided loop strap of a of a hook and loop type fastener attached.
Figure 5:
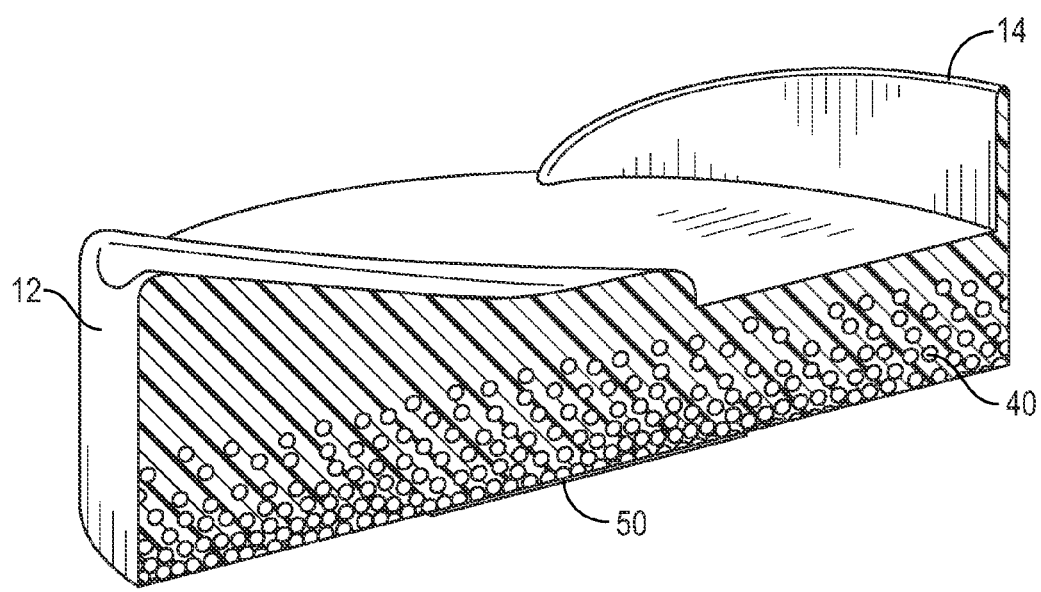
FIG. 5 is a sectional view of FIG. 3 of a pad showing expanded polypropylene spheroids embedded and half a hook and loop fastener on the bottom of the pad that is an embodiment of the invention.

Illustrations of embodiments of the invention are shown in FIGS. 1 and 2. FIG. 1 is an isometric view of an elastomeric shock-absorbing pad, 20, with expanded polypropylene spheroids, 40, embedded. The spheroids, 40, are about three (3) mm diameter. This pad is similar to that of US 20070107389 and has a front bumper 14 an frog support 12. While these features are important for some applications, they are not a requirement for the present invention. FIG. 2 shows a pad, 20, without these features. FIG. 3 shows an end view of the pad of FIG. 1 and shows placement of one half of a double sided loop strap of a of a hook and loop type fastener, 50, embedded in the bottom of the pad. FIG. 4 is a bottom view of the pad 10 of FIG. 1 and FIG. 3. FIG. 5 shows a cut-away view if the pad of FIG. 3. As illustrated in these Figures it is preferred that the spheroids, 40, be concentrated in the lower half of the isomeric pad. FIG. 2 is a picture of a bottom view of an elastomeric shock absorbing pad with expanded polypropylene spheroids embedded,

DEFINITION OF TERMS

As used herein, the term "spheroid" refers to particles with a generally elliptical shape, with a size large enough for individual particles to be visible to the human eye but small enough that they can be incorporated into an elastomeric matrix. Spheroid diameters generally fall in the range of forty (40) µm to two and fifty-four hundredths (2.54) cm (1.6×10$^{-3}$ to 1 inch), with the preferred size for this invention described below. Although elliptical in shape, the particles' geometry may be somewhat irregular, and may include angular surfaces.

The Spheroids
Spheroid Materials

The spheroids may be any material with sufficient flexibility and durability for incorporation into a shock absorbing orthotic pad. Spheroid material are of lower density than elastomeric polyurethane, capable of being adhered to by elastomeric polymer materials (preferably polyurethane), and generally spherical or elliptical in shape. Suitable materials may include, but are not limited to, polymers and elastomers, and preferably expanded foam or cellular formulation of these polymers. Specific examples include, but are not limited to, polypropylene and expanded polypropylene (PP), polyethylene and expanded polyethylene (PE), high density polyethylene (HDPE), ethylene propylene diene monomer (EPDM), polystyrene (PS), polyurethane and polyurethane foams, polystyrene, polybutadiene, styrene-butadiene rubber (SBR), and polyvinyl chloride. In one embodiment, polypropylene and polyethylene are preferred, with closed-cell expanded polypropylene being particularly preferred for its low density, high durability, flexibility, resilience, and thermal insulation.

The spheroid material, combined with the generally spherical geometry and the preferred size described hereafter, facilitates dispersion of the spheroids in the elastomer. These properties allow addition of the spheroids to the liquid elastomer without substantially increasing viscosity of the mixture to the point that the mold, particularly narrow components such as the toe, fill inconsistently and the elastomeric loses its gel properties. In an especially preferred embodiment, the spheroid material described is a closed cell expanded polypropylene and the elastomer is a polyurethane gel.

Mechanical Matching of Spheroids and Elastomer

A key property of the spheroids is the mechanical matching of the elastomer and the spheroids. Typically, flexible particles, such as those used in the construction, playground surfacing, and automobile industries, are held together by binding substances, such as polystyrene, which possess little to no flexibility. The sole flexibility of the resulting mixture arises from the flexibility of the spheroids themselves. In this invention, the spheroids are used as filler in a flexible elastomer. Thus, both the spheroids and the binding substance are flexible. Flexibility of both filler (spheroids) and binder (elastomer) allows superior adhesion of the spheroids to the elastomer, as compared to a rigid binder substance. Additionally, when the pad is repeatedly loaded (compressed as in use), both the spheroids and the binding material deform in response, thereby reducing the mechanical mismatch-induced loads on the interface between the filler spheroids and the binding elastomer. These two properties—superior adhesion and regional deformation of filler and binder—result in greater stability of the spheroids in the pad and more consistent shock absorbing properties of the elastomeric pad—i.e. without spots or portions that are harder or more inflexible than other spots.

Geometry of Spheroids

The generally spherical shape of the spheroids is also a key property for stability of the spheroids in the pad. For this invention, the key property of the geometry is the minimization of outside angles (i.e. the more faces a polyhedron has, the smaller each outside angle is). The smaller the outside angles, the closer the object approximates an elliptical shape, and the more desirable the geometry is for the purpose of this invention).

The generally spherical shape of the spheroids maximizes the amount of elastomer dispersed between each spheroid by minimizing the surface area of contact between surrounding spheroids.

In theory, there is an infinitesimally small surface area of contact between any adjacent, perfectly spherical spheroids. Practically, there will still be a relatively small area of contact, compared to the overall size of the spheroid, between adjacent flexible spheroids, allowing elastomer to fill the spaces between the spheroids. Because the elastomer is the binding material that serves to bond the spheroids to each other and to the pad, maximizing the amount of elastomer between spheroids is desirable. The more polyhedral the shape—particularly a rectangular shape—the greater the increase in the surface area of contact between surrounding filler particles, thereby decreasing the amount of elastomer between adjacent particles and resulting in decreased particle stability in the pad.

Size of Spheroids

The spheroid diameters are desirably in the range of one (1) to six (6) mm ($3.9 \times 10^{-2}$ to $2.4 \times 10^{-1}$ inches). In a preferred embodiment, the spheroids have a diameter of approximately two (2) to four (4) mm ($7.9 \times 10^{-2}$ to $1.6 \times 10^{-1}$ inches), with approximately three (3) mm ($7.9 \times 10^{-2}$ inches) being particularly preferred. Spheroids of these sizes are small enough to be incorporated into the elastomer and large enough to not unduly increase viscosity of the polymer mixture during molding or to substantially increase the hardness of the pad. If the spheroids are too large the result is a kind of permanent set reducing the flexibility and compressibility of the gel and impairing the pumping action that comes from loading and unloading of the gel as the horse shifts its weight.

Density of Spheroids with Respect to the Elastomer Density and the Weight of Pad One of the key properties of the spheroids is their low density compared to the elastomer, resulting in a lower overall weight-to-volume ratio of the pad. This reduces the weight of the entire equine boot and pad assembly, addressing concerns relating to weight mentioned in the previous background discussion. The difference in density between the spheroids and the elastomer causes the spheroids to rise towards the top of the mold during casting, which becomes the bottom of the pad. More details of this process are discussed in the relevant section following. It is preferred that the elastomer be significantly denser than the spheroids. Because the spheroids are lower density than the elastomer, the spheroids rise and accumulate at the top of the mold-bottom of the pad during molding of the pad. The pad will then consist of a top layer comprised predominately of elastomer(s), that will be in contact with the hoof, and a bottom layer of spheroid-filled elastomer that provides a thermal barrier to protect the hoof from overheating while still providing deep-volume cushioning. It is obvious that in other embodiments the relative densities of the spheroids and elastomer(s) may be varied to control the relative positions of elastomer and spheroids.

The density of the foam or expanded spheroids is desirably in the range of about twenty (20) to five hundred twenty (500) grams/liter (g/l). For example, expanded polypropylene beads have a density range of about ten to two hundred (10-200) g/l, and the preferred mid density beads have a density range of from about forty to one hundred twenty (40-120) g/l. One preferred elastomer for the pads, having a shore A hardness in the range of eighteen to twenty-two (18-22), has a density of about one thousand twenty-five to one thousand seventy (1025-1070) g/l, so the ratio of density of elastomer to spheroid will be in the range of from about eight to twenty-eight (8-28). It is suitable that the spheroids be at least half the density of the elastomer and preferably no more than about 30% as dense.

Example of a Pad of the Invention

An polyurethane elastomer pad having a Shore A density of about twenty (20) was prepared as described below with about thirty-four (34) percent expanded polypropylene spheroids. The resulting pad had nearly about thirty-four (34) percent reduction in weight, no appreciable increase in hardness, and no loss in ability to attach a loop and hook double sided hook strap to the elastomer as it was curing. The spheroids have so little weight that they produce a weight reduction approximate to their volume percentage in the mix with the heavier polyurethane matrix.

In embodiments where polyurethane gel pads are filled with expanded polymer foam spheroids, the volume percentage of spheroid to elastomer will be in the range of ten to forty-five (10-45) percent, with a preferred range of about twenty to forty (20-40) percent, and a more preferred range of about thirty to forty (30-40) percent.

Thermally Insulative Property of Spheroids

In general, the spheroids described are comprised of material(s) with thermally insulative properties. Incorporation of thermally insulative spheroids increases the thermal insulation of the pad. This insulative property is especially desirable to shield the equine hoof from excessive heat transfer from high temperature roadways during transport and hot surfaces of stalls, roadway and arenas where horses have to stand for any significant period of time.

Multiple Types of Spheroids

Multiple types of spheroids may be used, differing in composition, size, etc. These different spheroids may be divided into approximately distinct regions of the pad, or may be mixed together. This may be desirable in order to achieve certain weight, thermal insulation, durability, support and cushioning properties of the pad.

The Process

In broad aspect, the method for manufacturing the improved pads comprises mixing spheroids with one or more elastomer components during curing to form a molded flexible, shock absorbing pad. In a preferred embodiment, the elastomer is polyurethane, as described in the previously incorporated references, and the spheroids are low density, high durability, thermally insulative, elastic material, as discussed more fully previously. The resulting gel orthotic pad is lighter weight and more thermally insulative compared to a pad solely made of polymer material such as polyurethane gel, while retaining or enhancing its qualities of 1) durability when subjected to the load and wear of normal use by equines, and 2) deep, cushioning support of the equine hoof.

In general, the basic process is to mix the elastomer components and catalysts, and to disperse the spheroids in the unset elastomer during curing while the elastomer is still substantially in the liquid state. A mold of the desired size and shape is filled with the resulting mixture and the mixture is allowed to set and cure.

In a preferred embodiment, the method comprises mixing the chosen with spheroids before curing of the elastomer is complete to form a homogeneous suspension. This mixture is poured into an open mold in which the open top of the mold is the bottom of the boot. The spheroids will tend to rise to the top of the mold, accumulating in the upper portion of the pad. Once the elastomer is properly cured, the pad is removed from the mold. The resulting pad is comprised of a layer of elastomer in the upper portion of the pad suitable for exposure to the abrasive horse hoof or shoe, and a layer of elastomer-bound spheroids in the lower portion of the pad suitable for thermally insulating the hoof from the ground, absorbing shock, and reducing the overall weight of the pad. A middle layer is comprised of an increasing concentration of spheroids dispersed in elastomer as one progresses from the top of the pad towards the bottom.

It is well within the abilities of one of ordinary skill in the art to select quantities for the variables disclosed above, based on the materials used. Preparation of the elastomer and mixture, preparation of the mold, and pouring and curing of the part are well within the abilities of one of ordinary skill in the art.

Variables for Control of Travel Rate of Spheroids

The rate at which the spheroids travel through the liquid elastomer to accumulate at the top of the curing part (which will be the bottom of the finished pad) may be controlled by the curing rate. This rate is affected by three main variables: 1) the amount of catalyst used in formulating the elastomer, 2) the duration of mixing of the elastomer and/or the spheroid-and-elastomer mixture, and 3) the temperature of the elastomer components before mixing. Controlling travel rate of the spheroids will control the depth of dispersal of the spheroids through the finished pad.

Attachment of Hook-and-Loop Type Fastener System

When an animal turns its hoof while wearing the pad and boot assembly described above, the pad tends to rotate within the boot. Therefore, while the pad should be easily removable from the boot, it should also be securely attached inside the boot to resist the significant rotational torque applied to the junction between the pad and the boot. In a current commercial embodiment of the pad and boot assembly, a double sided Velcro®-type hook-and-loop tape is secured to the bottom of the pad for use in attaching the pad inside the boot. Secure attachment of the hook-and-loop tape to elastomer material of the pad is necessary because of the mechanical mismatch between highly elastic elastomer and the non-elastic hook-and-loop tape. The present method of adding spheroids allows this hook-and-loop tape to be secured to the bottom of a pad manufactured from elastomer without interfering with the method of securing the hook and loop part to the elastomeric pad.

In one embodiment of the process, spheroids are initially dispersed evenly throughout a liquid elastomer, as described previously. This procedure allows the hook-and-loop tape to bind to the elastomer before the spheroids rise to the top of the mold, which is the bottom of the pad. As the spheroids rise, they collect around the hook-and-loop tape, but do not accumulate to any significant extent underneath the tape. Were the elastomer/spheroid filled pad allowed to cure before attaching the hook and loop tape, it would not be possible to adequately secure the tape to the pad and some less convenient and less adequate means of securing the pad and boot would be required. Thus, the hook-and-loop tape is attached more securely to the bottom of the pad than it would be if it were applied after the pad was formed.

The Pad

In broad aspect, the pads of this invention is a reduced weight version of those described in U.S. Pat. No. 7,445,051, issued Nov. 4, 2008 and patent publications 20070107389, published May 17, 2007 and 20090032270, published Feb. 5, 2009 and is formed by the dispersion of spheroids in the base elastomer(s).

Geometry of Pad

The base of the shock absorbing orthotic pad is generally shaped to both approximate the shape of the animal's hoofprint and fit into the boot. It has been found that the shape of the pad is important. Completely round pads do not to perform well in actual use, as they tend to rotate in the boot. An elliptically shaped pad is desirable to maintain consistent fit and to prevent rotation of the pad in use. The shape will depend on the nature of the hooves; for example, Arabian horses generally have more elongated hooves than do Quarter horses. Moreover, more elongated oval shapes are especially useful in laminitis affected horses, where the hoof is tilted downward because of the abnormal growth rates of the hoof walls caused by the compromised tubules of the laminae. Therefore, in one embodiment, the pad is elliptically shaped.

Triangular and Front Projections

In one embodiment, on the backside of the base, opposite the ridge, is a truncated frog support (see element 12 of FIGS. 1, 3 and 5). This is a triangular projection above the surface of the base. This triangular projection is designed to approximately correspond to the shape and location of the frog of a horse's hoof and contact the frog during use, providing a kind of massage to the frog of the hoof. Thus, blood circulation is stimulated and stress on the animal's legs and tendons is relieved. In another embodiment, a front support provides cushioning to the toe of the hoof—element 14 of FIGS. 1, 3 and 5.

In some embodiments, the pad will not have the triangular projection or the front projection—see FIG. 2. For example, when used with a horse that has an abscessed or injured frog, it may be desirable to use a pad without the frog support. However, even without the frog support, the front ridge projection is often useful, especially for a horse with a severely injured or damaged hoof. At times it is necessary to resection (remove the front hard hoof surface) a horse's hoof if it is damaged or diseased. Such is the case with advanced laminitis. In these cases, the soft front support ridge provides extra comfort to the hoof, especially if the pad is wedge-shaped (sloped) in a way that forces the front of the hoof downward.

Pad Base

The pad base bears the burden of supplying the bulk of the support for the animal. The frog support is an aid to stimulation of the frog and is not the principal means of supporting the hoof. In this way, the present invention differs from previous frog support shoes or pads that allow the hoof wall to move. An advantage of the relatively large and soft pad (Deep Gel™) is that it enables the horse to adjust the position of its hoof to the most comfortable position. The relatively large depth and volume of the pad is important to its success as a therapeutic tool to support the sole and the hoof. Support of the rear of the hoof reduces the pull of the deep flexor tendon on the coffin bone in tendinitis, and serves to reduce pain and provide support for healing of the lamina. The raised angle of the rear portion of the pad combined with the gel redistribution with movement of the hoof allows the horse to adjust its stance reducing the pull on the deep flexor tendon.

Pad Material

The elastomeric portion of the pad can be made of any suitable elastomeric material that provides flexibility, shock absorbency, some degree of elasticity, resilience, and dimensional stability. Polyvinyl chloride (PVC), polysilicone, and similar elastomers, well known to those in the art, are also suitable. Unlike the spheroid materials, however, foams and other materials with little resistance to abrasion are unsuitable, due to the abrasion the material must endure from being in contact with the hoof. Similarly, non-elastomeric materials are generally unsuitable because they do not provide sufficient cushioning for the hoof.

In a preferred embodiment, the elastomeric shock absorbing pad is constructed of a cast polyurethane elastomer. For example, polyurethane casting elastomer having a Shore A hardness of from about eight (8) to about seventy (70) is suitable. In some situations, very soft pads are desirable. These will generally be thicker than harder pads, and will have a Shore 00 hardness of about five (5) to seventy (70). It is preferred that the material for the pads of this invention have low rebound resiliency, generally lower that twenty-five (25) percent and preferably between two (2) and ten (10) percent.

In another embodiment, the pads may be comprised of multiple elastomer materials such that one region of the pad is made up of one type of elastomeric material and transitions into one or more other regions comprised of different elastomer materials. This may be desirable, for instance, in a dual density orthotic pad designed so that the rear of the hoof is on a harder material than the toe, elevating the heel and allowing the toe to sink deeper into the cushioning pad and creating a wedge-shaped support for the hoof, altering the resting position of the hoof. Spheroids will be in at least one of these regions, as desired to balance durability, weight, thermal insulative properties, hardness, and support. These elastomeric pads are sometimes referred to herein as "pads," "gel pads," "shock absorbing pads," and "orthotic pads."

SCOPE OF THE INVENTION

In this specification and Figures, the invention has been described with reference to specific embodiments. It will be evident, however, that various modifications and changes can be made thereto without departing from the broader spirit and scope of the invention as set forth in the appended claims. The specification is, accordingly to be regarded as illustrative rather than a restrictive. Therefore, the scope of the invention is limited only by the appended claims.

The invention claimed is:

1. A process, for making an elastomeric pad of elastomeric material for use in a boot beneath an equine hoof, comprising, dispersing polymeric spheroids into an elastomeric material prior to curing the elastomeric material and curing the elastomeric materials to produce a solid elastomeric pad having spheroids dispersed therein and, wherein the spheroid material is of lower density than the elastomeric materials; locating and arranging of the spheroids dispersed in the pad by controlling the use at least one of the processing steps consisting of 1) the amount of catalyst used in formulating the elastomeric material, 2) the duration of mixing of the elastomeric material and/or the mixture of spheroids and elastomeric material, and 3) the temperature of the components of the elastomeric material before mixing.

2. The process of claim 1 wherein spheroids are mixed and dispersed in the uncured elastomeric material during a curing process of the elastomer.

3. The process of claim 2 comprising the step of pouring the mixture of spheroids dispersed in uncured elastomeric material into an open mold in which the open top of the mold corresponds to the bottom of the finished pad.

4. The process of claim 1 wherein a double sided loop portion of a hook-and-loop fastener is partially embedded in the elastomeric material prior to curing.

5. The process of claim 4 wherein the double sided loop portion of a hook-and-loop fastener is centered in the bottom of the pad and of sufficient size to securely connect with a matching hook and loop.

* * * * *